United States Patent [19]

Fessett

[11] 4,186,624
[45] Feb. 5, 1980

[54] SEQUENTIAL DRIVE MECHANISM
[75] Inventor: Donald J. Fessett, Industry, Calif.
[73] Assignee: Western Gear Corporation, Lynwood, Calif.
[21] Appl. No.: 786,085
[22] Filed: Apr. 11, 1977
[51] Int. Cl.² .................... F16H 37/00; F16H 37/06; F16H 3/74
[52] U.S. Cl. .................... 74/679; 74/665 K; 74/751
[58] Field of Search ............. 74/764, 679, 751, 674, 74/665 S, 665 K

[56] References Cited
U.S. PATENT DOCUMENTS

| | | | |
|---|---|---|---|
| 2,857,097 | 10/1958 | Mackway | 74/665 K |
| 2,929,268 | 3/1960 | Ferro et al. | 74/674 |
| 3,116,817 | 1/1964 | Quick et al. | 74/764 |
| 3,435,790 | 4/1969 | Hale | 74/679 |

*Primary Examiner*—Lance Chandler
*Attorney, Agent, or Firm*—Fulwider, Patton, Rieber, Lee & Utecht

[57] ABSTRACT

A drive mechanism in which rotary power is supplied in sequence to one output shaft and then to another, the desired arrangement of one input and two outputs being provided by a planetary transmission. Each output shaft is connected to a set of notched cams that rotate at different speeds as the output shaft turns. When the notches of a set of cams become aligned, they are engaged by a pawl that arrests the associated output shaft while simultaneously releasing the other output shaft.

36 Claims, 9 Drawing Figures

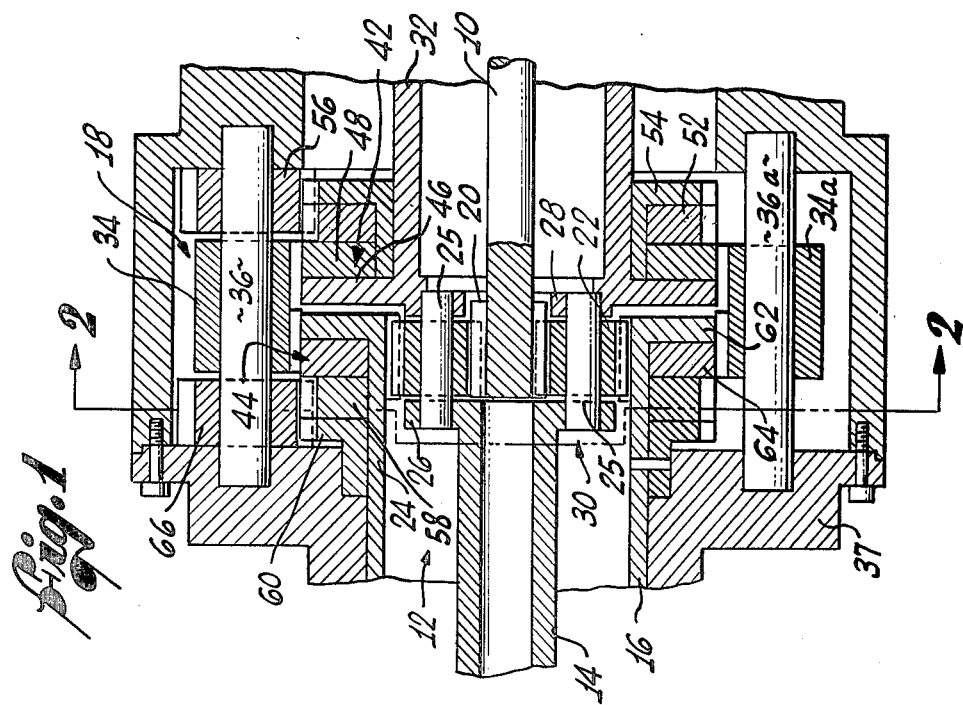
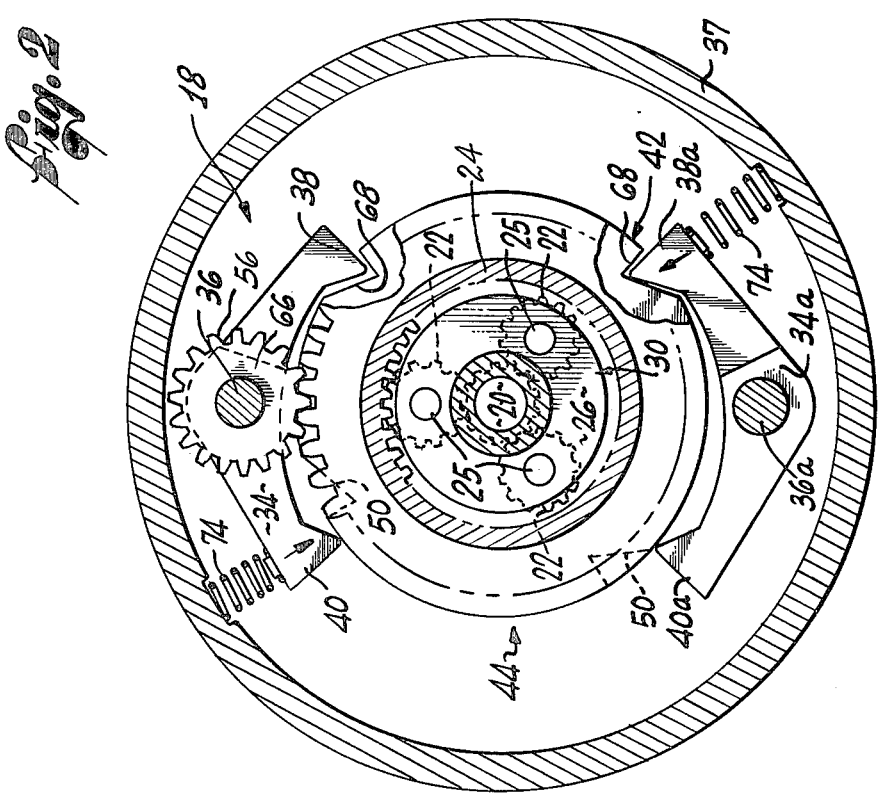

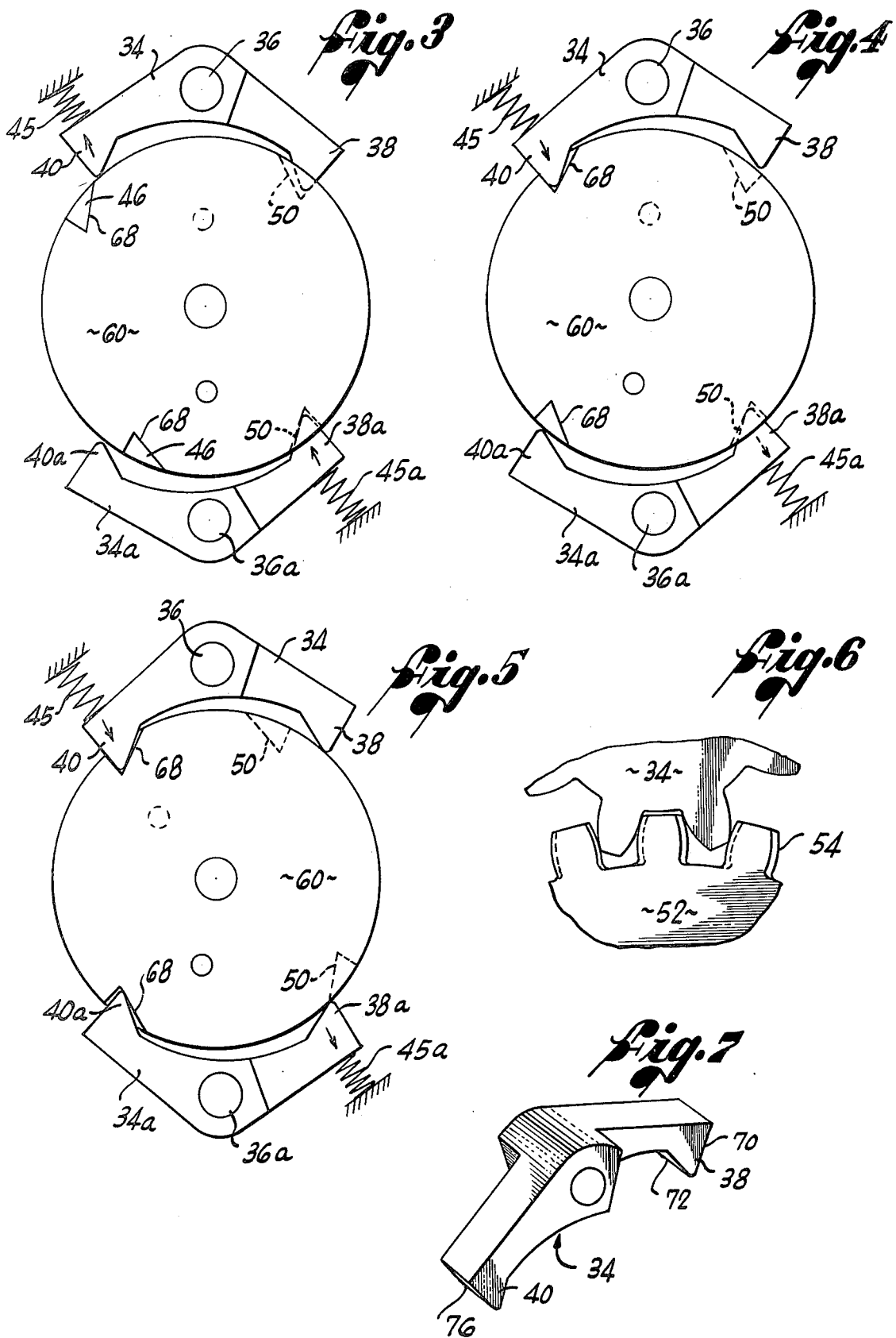

SEQUENTIAL DRIVE MECHANISM

BACKGROUND OF THE INVENTION

The present invention relates to a drive mechanism, and more particularly to a drive mechanism having two output shafts, each of which is sequentially selected to receive power from a single input shaft.

There are many situations in which a rotary drive must be applied to one task and then, after a predetermined number of rotations, shifted to another related task. In aircraft equipped with multiple wing flaps, for example, the main flap is adjusted first, followed by a smaller flap on the trailing edge. Conventionally, this requires two power actuators operated in sequence and controlled by electric circuitry and accompanying position sensors.

Other aircraft are provided with pivotable wings so that they can be moved from a folded or stored position to a conventional in-flight position. After the wings have unfolded, they must be secured by a latch pin. Conventionally, the wing is moved by a motor, but must be latched by a separately powered operation. The same steps are performed in the reverse sequence to return the wings to their folded position.

In repetitive aircraft operations of the above type, mechanical limiting devices have been employed which limit the number of rotations of a shaft used, for example, to fold the wings of the aircraft. One such limiting device utilizes two or more notched concentric cams that are rotated at different speeds. After a predetermined number of revolutions, the notches become aligned and a pawl that engages all of the cams simultaneously drops into the notches, thereby arresting the power supply shaft. The cams are driven by concentric cam-drive gears that are of equal diameter but have different numbers of teeth. One of these gears is a master gear and the others are slave gears, the slave gears being driven by the master gear through an idler gear.

While these previously known limiting mechanisms are capable of arresting the rotation of a shaft at the proper time, they apply only to one separately powered task. Accordingly, they have no true sequencing function.

There are many such repetitive sequential operations that could be performed advantageously by a single mechanical drive mechanism, if such a mechanism could be devised that is simple and compact, but nevertheless provides the desired outputs in the proper predetermined sequence with the necessary precision.

SUMMARY OF THE INVENTION

The present invention provides a drive mechanism having two output shafts, each of which is alternately powered in a predetermined sequence. The input power to the device is supplied by a single input shaft, transfer of the power to one output shaft or the other being controlled by the relative positions of deformations on a plurality of rotatable cams.

The invention utilizes a single power source to supply power to both output shafts, but nevertheless eliminates the need for brakes, clutches, electronic servomechanisms, control circuitry and many other components conventionally associated with the sequential application of a power source to two successive tasks. Moreover, the mechanism follows its predetermined sequence automatically without introducing any opportunity for human error Preferably, the transfer of power from one shaft to another occurs when the deformation of at least two cams are aligned for simultaneous engagement by a single pawl. The cams rotate at different speeds, causing the deformations to be aligned periodically. Although relatively small, the cams are capable of measuring large numbers of revolutions with a high degree of reliability and precision.

In one embodiment of the invention, a plurality of commonly engaged gears, each connected to a different cam, have different numbers of teeth to provide different rotational speeds. In a particularly compact arrangement, the cam-drive gears are concentric and have substantially equal diameters despite the difference in the number of teeth.

It is advantageous to provide two sets of gears driving two sets of cams, one set being associated with each output shaft. One gear of each set may be a master gear connected directly to the output shaft and an interconnecting idler gear driven by the master gear drives the other gear or gears of that set. When the deformations, preferably notches, of the cams of a set are aligned, they are engaged by a pawl that locks that set of cams against further rotation. Since one cam of each set is connected to an output shaft, the rotation of the connected shaft is thereby arrested, and power is consequently transferred to the other output shaft.

If it is desired that the non-rotating output shaft be arrested against rotation in either direction, this feature can be provided by utilizing two cooperating pawls for one set of cams, each pawl restraining rotation in one direction. In a mechanism having this feature, each cam is provided with two notches spaced apart for simultaneous engagement.

A planetary transmission of conventional design is well suited for use in combination with the stop mechanism described above. The input shaft may be connected to a sun gear, while a first output shaft is connected to a carrier that positions a plurality of planet gears, and the second output shaft is connected to a ring gear that encircles the planet gears. When either of the output shafts is arrested by the stop mechanism, the rotation of the input shaft is automatically transmitted to the other output shaft. The cams and cam-drive gears encircle the transmission, the components being interrelated in such a manner that the entire mechanism is only slightly larger than the transmission itself.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 1 is a cross-sectional view of a sequential drive mechanism embodying the novel features of the present invention;

FIG. 2 is another cross-sectional view taken along the line 2—2 of FIG. 1, but differing in that the transmission has three planetary gears instead of two;

FIGS. 3 to 5 are schematic representations showing the stop mechanism in various phases of its operation;

FIG. 6 is an enlarged fragmentary view of the engagement of two cam-drive gears of the stop mechanism;

FIG. 7 is an enlarged perspective view of a rocker that forms a part of the stop mechanism;

DESCRIPTION OF THE PREFERRED EMBODIMENT

Figure 8:
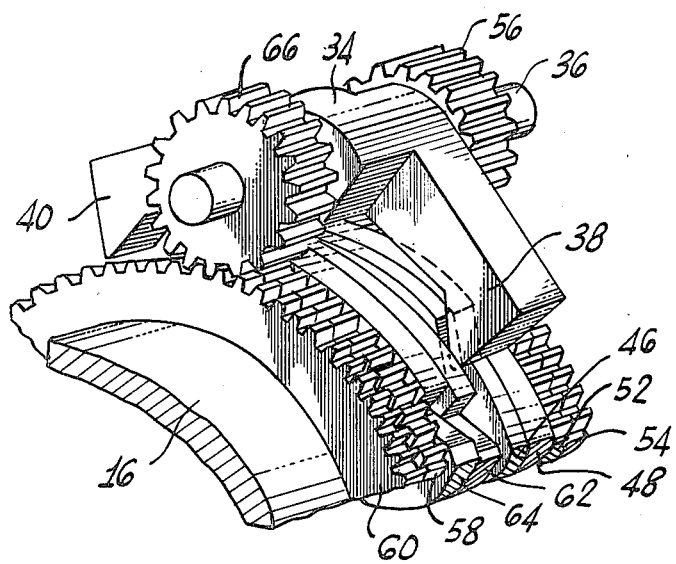
FIG. 8, is an enlarged perspective view of a fragmentary portion of a drive mechanism including the stop mechanism.

The drive mechanism of the present invention, illustrated in the accompanying drawings, transfers rotary power from an input shaft 10 through a planetary transmission 12 to either of two output shafts 14 and 16. A stop mechanism 18 alternately arrests the rotation of one output shaft or the other, so that the output power is supplied only through the remaining unarrested output shaft.

The Planetary Transmission

The planetary transmission 12, shown in FIGS. 1 and 2, is of conventional design including a sun gear 20 connected to the input shaft 10, a plurality of planet gears 22 surrounding the sun gear, and a ring gear 24 that encircles the planet gears. The planet gears 22 are mounted on shafts 25 engaged at either end of two disk-shaped pieces 26 and 28 that form a rotatable carrier 30. While the planet gears 22 are free to rotate relative to the carrier 30, they are held in fixed equidistant positions relative to each other.

The first output shaft 14 is preferably formed as an extension of the first carrier piece 26 for rotation therewith. It is axially aligned with the input shaft 10 but extends away from the transmission 12 in the opposite direction. A hollow shaft 32, surrounding the input shaft 10 and integrally formed with the second piece 28, also turns at the speed of the carrier 30. The second output shaft 16 is integrally formed with the ring gear 24. It is a hollow shaft that is concentric with and surrounds the first output shaft 14.

If the ring gear 24 remains stationary while the sun gear 20 rotates, the planet gears 22 will revolve about the sun gear 20 as the carrier 30 rotates, thereby rotating the first output shaft 14. Conversely, if the carrier 30 remains stationary, the rotation of the sun gear 20 will be transmitted through the planet gears 22 to the ring gear 24 and the second output shaft 16, although the direction of rotation will be opposite that which would be taken by the first output shaft 14. It will, therefore, be apparent that rotary power can be delivered selectively by the transmission 12 to either of the output shafts 14 and 16, depending upon whether the carrier 30 or the ring gear 24 is arrested.

The Stop Mechanism

Figure 9:
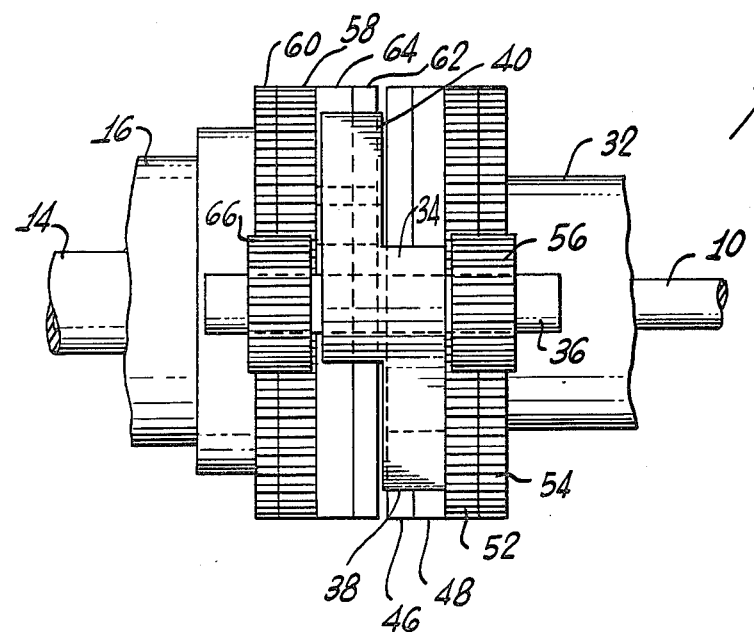
FIG. 9 is a plane view of the drive mechanism also showing the stop mechanism.

To selectively and sequentially arrest the carrier 30 or the ring gear 24 is the function of the stop mechanism 18, also shown in FIGS. 1, 2, 8 and 9, which includes a pair of oblique V-shaped rockers 34 and 34a disposed along the periphery of the ring gear 24. Each rocker 34, 34a, shown separately in FIG. 7, is pivotable about a rocker shaft 36, 36a at its midpoint, axially aligned with the shafts 10, 14 and 16 of the transmission 12. The rocker shafts 36 and 36a are journaled within a generally cylindrical casing 37 that surrounds the entire drive mechanism. A pawl 38, 38a at one end of each rocker 34, 34a is offset laterally from a pawl 40, 40a at the opposite end.

Two sets of cams 42 and 44 are positioned to be engaged by the pawls 38, 38a and 40, 40a, respectively. One pawl 38, 38a of each rocker 34, 34a is urged by a spring 45, 45a toward engagement with the corresponding set of cams 42, 44. The first set of cams 42 is associated with the first output shaft 14. It includes a stop cam 46 that is attached circumferentially to the outer surface of the second carrier piece 28 for rotation therewith, and a ring-shaped sequencing cam 48 of equal diameter that is freely rotatable about the hollow shaft 32. Each of the cams 46 and 48 of the first set has two notches 50 spaced apart on its outer periphery. Since one pawl 38, 38a is wide enough to engage the outer edges of both cams 46 and 48 simultaneously, it cannot drop into the notches 50 unless a notch on each of the two cams is aligned, as shown most clearly in FIG. 8 in which alignment is about to occur.

Alignment of the notches 50 is controlled by a set of two ring-shaped cam-drive gears 52 and 54 concentric with the cams 46 and 48 and disposed axially outward therefrom. The outermost gear 54, which is the master gear, is attached to the carrier 30 by the hollow shaft 32 so that is always rotates with the carrier and the stop cam 46. The slave gear 52 is adjacent the master gear 54 and attached directly to the adjacent sequencing cam 48 on its other side. It is free to rotate on the hollow shaft 32.

When the master 54 is rotated, it drives an idler gear 56 mounted on one end of the upper rocker shaft 36, and the idler gear is wide enough to simultaneously engage and rotate the slave gear 52, as shown in FIG. 6. Although the master and slave gears 54 and 52 are of the same diameter, the master gear has one more tooth and therefore rotates at a slightly lower speed. After a predetermined number of revolutions, the notches 50 of the two disks 46 and 48 become aligned, allowing engagement by the pawls 38 to arrest rotation of the carrier 30 and the first output shaft 14.

It will be understood that each of the cams 46 and 48 is provided with two notches 50. The notches 50 are so spaced that when one notch of a cam is aligned with the pawl 38 of the upper rocker 34, the other notch of that cam is simulataneously aligned with the corresponding pawl 38a of the lower rocker 34a.

The stop mechanism 18 further includes a similar arrangement for arresting rotation of the ring gear 24 and the second output shaft 16. For this purpose, the second set of cams 44 consists of a stop cam 62 integrally formed as an outwardly projecting flange on a circumferential edge of the ring gear 24, and an adjacent sequencing cam 64 rotatable on the outer surface of the ring gear and disposed axially outward from the stop cam. A master cam-drive gear 60 is attached to the ring gear 24 and the stop cam 62 for rotation therewith, while a slave gear 58 is attached to the sequencing cam 64 on one side and is adjacent the master gear on the other side. The master gear 60, which has one additional tooth, drives the slave gear 58 through an idler gear 66, journaled on the end of the upper gear shaft 36 opposite the aforementioned idler gear 56.

The cams of the second set 44 each carry two notches 68, similar to the notches 50 of the first cam set 42. When the notches 68 of the second set 44 are aligned, the pawl 40 on the upper rocker 34 drops into those notches, arresting the rotation of the ring gear 24 and thereby arresting the second output shaft 16. Simultaneously, a pawl 40a on the lower rocker 34a engages the remaining notches 68 of the same cams. The rockers 34 and 34a must, at all times, engage the notches of one set of cams or the other, as they are not spaced far enough from the circumferential edges of the cams do disengage both sets of cams 42 and 44 simultaneously. One of the two output shafts 14 and 16 must, therefore, be arrested at all times.

It will be noted that the cams 46, 48, 62 and 64 and the camdrive gears 52, 54, 58 and 60 all encircle the planetary transmission 12 within the casing 37, riding on or being connected to the carrier 30 or the ring gear 24. Accordingly, these components contribute surprisingly little to the size and weight of the composite mechanism, although their functional outer diameters are relatively large. Moreover, the rockers 34 and 34a and the idler gears 56 and 66 are of small size and fit conveniently within the casing 37. The use of direct interconnections between cooperating components is maximized throughout the mechanism, thereby providing smooth, positive and precise operation. Manufacturing costs are also reduced by minimizing the number of separate parts required.

It should be noted that each V-shaped pawl 38, 38a, 40 and 40a has an outwardly facing stopping surface 70 at its outer end that is substantially aligned with radii of the cams 46, 48, 62 and 64, while the inwardly facing side of the pawl forms a lifting surface 72. The shape and orientation of the notches 50 and 68 correspond closely to that of the pawls. Each pawl, therefore, blocks rotation of a set of cams 42 or 44 in one direction, but will be forced out of engagement with the notches 50 or 68 of that set in a ratchet-like manner by rotation of the cams in the opposite direction. Due to the spacing of the notches, each set of cams 42 and 44 is simultaneously engaged by the two oppositely facing pawls, one from each of the two rockers 34 and 34a, thereby providing for bi-directional arrest of the associated output shaft 14 or 16.

Operation

The operation of drive mechanism is assumed, for purposes of this explanation, to begin with the cams 46 and 48 engaged by the pawls 38 and 38a, as illustrated schematically in FIG. 3. Thus the first output shaft 14 and the carrier 30 are arrested, while the rotation of the input shaft 12 is transmitted to the second output shaft 16. Rotation of the second output shaft 16 in a clockwise direction (as viewed in FIGS. 3-5) will proceed for a predetermined number of revolutions, while the notches 68 of the cams 62 and 64 pass under the pawls 40 and 40a without engagement. When a single notch 68 of one of these cams 62 or 64 is aligned with one of the pawls 40 or 40a, the non-alignment of the notches 68 of the other cam of the same set 44 prevents the pawls 40 and 40a from moving inwardly. However, the notches 68 move closer together with each revolution due to the difference in speeds of the cams 62 and 64. Eventually, the notches 68 of the faster moving sequencing cam 64 will overtake the notches 68 of the adjacent stop cam 62 and alignment will occur.

With the notches 50 and 68 of all the cams instantaneously aligned, as shown in FIG. 4, the rockers 34 and 34a will be free to move toward a position of engagement with either set of cams 42 or 44. Each rocker 34 and 34a will pivot to assume the position toward which it is urged by the rocker bias spring 45 or 45a. The upper rocker 34 is urged toward engagement with the cams 46 and 48 of the first set 42, while the lower rocker 34a is urged toward engagement with the cams 62 and 64 of the second set 44. Both output shafts 14 and 16 are thus held against clockwise rotation, but each is free to rotate in a counterclockwise direction by pushing the pawl 38 or 38a by which it is engaged into engagement with the other set of cams. It is, however, a characteristic of a planetary transmission that the two outputs are driven in opposite directions, and while the second output shaft 16 can no longer be driven in a clockwise direction, the first output shaft 14 is free to turn in a counterclockwise direction. Once the lower rocker 34a is forced by rotation of the cams 46 and 48 to engage the cams 62 and 64, the second output shaft 16 will be arrested bi-directionally, and the first output shaft 16 will be free to continue its rotation, as shown in FIG. 5.

It is possible to reverse the operation of the device by rotating the input shaft 12 in the opposite direction. When the first output shaft 14 has made the same number of revolutions in a clockwise direction that it previously made in the counterclockwise direction, the notches 50 of the cams 46 and 48 will be realigned and the power will be transferred to the second output shaft 16, now urged in a counterclockwise direction, in the same manner as described above.

The reversability of the invention is useful in many practical applications. If, for example, it is used to first fold and then latch the wings of an aircraft, its operation cam be reversed to unlatch and then unfold the wings, and the transfer of power between one output shaft 14 or 16 and the other, i.e., between the pivoting and latching functions, will always occur at the proper point in the operating cycle.

It will be understood that the number of teeth on each cam-drive gear 52, 54, 58 and 60, like the gear ratios of the transmission 12, should be selected to provide the particular cycle of operation required for a specific application. If a large number of revolutions of an output shaft 14 or 16 is required before the input power is transferred, it may be desirable to increase the number of notched cams and corresponding cam-drive gears in each set accordingly.

Although the invention has been described in connection with a specific embodiment thereof, it will be clear that modifications and changes can be made without departing from the spirit and scope of the invention as defined by the appended claims.

I claim:

1. A drive mechanism comprising:
   an input shaft;
   first and second output shafts;
   transmission means for alternatively transmitting power from said input shaft to either of said output shafts;
   a plurality of rotatable cams;
   cam-drive means for driving said cams at different rotational speeds in response to the rotation of at least one of said shafts; and
   stop means for arresting rotation of said first output shaft when said cams have a first predetermined relationship and for arresting rotation of said second output shaft when said cams have a second predetermined relationship.

2. The drive mechanism of claim 1 wherein said stop means includes at least one rocker having a pawl at each end thereof engageable with at least one of said cams.

3. The drive mechanism of claim 1 wherein:
   said cams have notches therein; and
   said stop means includes one or more pawls engageable with said notches.

4. The drive mechanism of claim 3 wherein said cams are rotatable about a common same axis.

5. The drive mechanism of claim 3 wherein said cams are rotatable about the longitudinal axis of one of said shafts.

6. The drive mechanism of claim 1 wherein said cams and said shafts are all rotatable about a common axis.

7. A drive mechanism comprising:
an input shaft;
first and second output shafts;
transmission means for alternately transmitting power to either of said output shafts;
a plurality of rotatable cams;
a plurality of cam-drive gears each connected to one of said cams for rotation therewith, at least one of said cam-drive gears being operatively connected to one of said shafts for rotation therewith, said cam-drive gears being of substantially the same diameter but having different numbers of teeth;
a gear meshing with said cam-drive gears for causing rotation of said cam-drive gears at different speeds; and
stop means for engaging said cams and thereby arresting rotation of at least one of said output shafts.

8. The drive mechanism of claim 1 wherein said cams, said cam-drive gears and said shafts are all rotatable about a common axis.

9. The driven mechanism of claim 7 wherein said transmission is a planetary transmission.

10. The drive mechanism of claim 1, wherein:
said cams have deformations on the circumferential edges thereof; and
said stop means comprises a rocker having a pawl on one end thereof and spring means for urging said pawl against said circumferential edges of said cams, whereby said pawl arrests rotation of said cams when said deformations are simultaneously aligned with said pawl.

11. A drive mechanism comprising:
an input shaft;
first and second output shafts;
transmission means for alternately transmitting power from said input shaft to either of said output shafts;
a plurality of rotatable cams each having a deformation thereon;
cam-drive means for driving said cams at different rotational speeds in response to the rotation of one of said shafts, said cam drive means comprising a plurality of cam-drive gears rotatable about a common axis and of substantially equal diameter but having different numbers of teeth, and an idler gear engaging said cam-drive gears, each of said cam-drive gears being connected to one of said cams for rotation therewith; and
stop means for engaging said deformations and thereby arresting rotation of one of said output shafts when said deformations simultaneously assume predetermined positions.

12. The drive mechanism of claim 11, wherein said transmission means is a planetary transmission.

13. The drive mechanism of claim 11, wherein one of said cam-drive gears is attached directly to one of said shafts for rotation therewith.

14. A mechanism for driving either of two output shafts in a predetermined sequence, comprising:
an input shaft;
a sun gear connected to said input shaft for rotation therewith;
a plurality of planet gears engaging said sun gear;
a rotatable carrier on which said planet gears are mounted to revolve about said sun gear as said carrier rotates;
a ring gear surrounding said planet gears and engaged thereby;
a first output shaft connected to said carrier for rotation therewith;
a second output shaft connected to said ring gear for rotation therewith;
a plurality of rotatable cams encircling said ring gear and said carrier, each of said cams having a deformation therein;
means for rotating said cams at different speeds in response to rotation of one of said output shafts; and
stop means for engaging said deformations and thereby arresting one of said output shafts upon engagement with said notches when said cams simultaneously assume predetermined positions.

15. The drive mechanism of claim 14, wherein said means for rotating said cams comprises:
a plurality of cam-drive gears encircling said ring gear and said carrier, said cam-drive gears being of substantially equal diameter but having different numbers of teeth; and
an idler gear engaging said cam-drive gears, each of said cam-drive gears being attached to one of said cams for rotation therewith.

16. The drive mechanism of claim 15, wherein one of said cam-drive gears is attached directly to one of said output shafts for rotation therewith.

17. The drive mechanism of claim 16, wherein:
said deformations are notches on the circumferential edges of said cams; and
said stop means comprises a rocker having a pawl on one end thereof and spring means for urging said pawl against said circumferential edges of said cams, whereby said pawl arrests rotation of said cams when said notches are simultaneously aligned with said pawl.

18. A sequential drive mechanism comprising:
an input shaft;
first and second output shafts;
transmission means for alternately transmitting power from said input shaft to either of said output shafts;
a plurality of sets of cams having deformations thereon;
cam-drive means for separately driving each of said sets of cams in response to the rotation of an associated one of said output shafts, each cam of a set being driven at a different speed; and
stop means associated with said cams for engaging said deformations of a set of cams and thereby arresting the rotation of said output shaft associated with that set when the deformations of that set assume predetermined positions.

19. The sequential drive mechanism of claim 18, wherein said cam-drive means comprises:
a plurality of sets of cam-drive gears, each set of gears being connected to one of said cams for rotation therewith, said cam-drive gears that drive the cams of a single set being of substantially equal diameter but having different numbers of teeth; and means for interconnecting said cam-drive gears that drive the cams of a single set for rotation at different speeds.

20. The sequential drive mechanism of claim 18, wherein said stop means has two alternative conditions, one for arresting rotation of said first output shaft and another for arresting rotation of said second output shaft.

21. The sequential drive mechanism of claim 18, wherein said stop means includes at least one rocker having two pawls thereon, and said deformations are notches, the notches of each of said sets of cams being arranged for engagement by at least one of said pawls.

22. The sequential drive mechanism of claim 18, wherein said stop means includes two rockers, each of said rockers having two pawls thereon, and the deformations of each of said cams are notches spaced for simultaneous engagement by one pawl of each of said rockers, the two pawls that simultaneously engage one cam being shaped to arrest rotation of that cam in two opposite directions.

23. The sequential drive mechanism of claim 18, wherein said transmission means is a planetary transmission.

24. A sequential drive mechanism comprising:
an input shaft;
first and second output shafts;
planetary transmission means for alternately transmitting power from said input shaft to either of said output shafts;
first and second sets of rotatable cams associated with said first and second output shafts, respectively, each of said cams having at least one notch in the circumferential edge thereof;
first and second sets of cam-drive gears associated with said first and second set of cams, respectively, each of said cam-drive gears being operatively connected to one of said cams for rotation therewith, each set of cam-drive gears being formed by a plurality of gears having different numbers of teeth;
means for interconnecting said cam-drive gears of each set for rotation at different speeds; and
stop means for engaging said notches and thereby arresting rotation of one of said output shafts when said notches of the cams of the associated set assume predetermined rotational positions.

25. The sequential drive mechanism of claim 24, wherein:
said planetary transmission means includes a sun gear, a plurality of planet gears that engage said sun gear, a rotatable carrier on which said planet gears are mounted to revolve about said said sun gear as said carrier rotates, and a ring gear surrounding said planet gears and engaged thereby;
said input shaft being connected to said sun gear for rotation therewith;
said first output shaft being connected to said carrier for rotation therewith; and
said second output shaft being connected to said ring gear for rotation therewith.

26. The sequential drive mechanism of claim 25 wherein:
each of said sets of cam-drive gears includes a master gear and at least one slave gear, said master gear being attached directly to one of said output shafts; and
said interconnecting means comprises an idler gear engaging said master gear and said slave gear.

27. The sequential drive mechanism of claim 24, wherein said stop means comprises a rocker having at least one pawl thereon and spring means for urging said pawl against the circumferential edges of the cams of a set, whereby said pawl arrests rotation of said set when at least two of said notches of said set are simultaneously aligned with said pawl.

28. The sequential drive mechanism of claim 24, wherein each of said cams has at least two notches thereon, said stop means including at least two pawl means for engaging the notches of each cam, each of said pawl means restraining rotation of said cam in a different direction.

29. The sequential drive mechanism of claim 28, wherein each of said sets of cam-drive gears includes a master gear attached to one of said output shafts for rotation therewith and at least one slave gear driven by said master gear.

30. The sequential drive mechanism of claim 29, wherein said cam-drive gears of a set are of substantially equal diameter.

31. The sequential drive mechanism of claim 30, wherein said interconnecting means is an idler gear.

32. The sequential drive mechanism of claim 30 further comprising a rocker shaft, said interconnecting means being a plurality of idler gears mounted on said rocker shaft and said stop means including at least one pawl pivotably mounted on said rocker shaft.

33. The sequential drive mechanism of claim 32, further comprising spring means for urging said pawl toward said cam.

34. The sequential drive mechanism of claim 24, wherein said stop means includes two pawl means for engaging each cam, each of said pawl means arresting rotation of said cam in a different direction.

35. The sequential drive mechanism of claim 24, wherein said cams and said cam-drive gears encircle said transmission means.

36. A drive mechanism comprising:
an input shaft;
first and second output shafts;
transmission means for alternately transmitting power from said input shaft to either of said output shafts;
a plurality of rotatable cams each having at least one notch on a circumferential edge thereof;
cam drive means for driving said cams at different rotational speeds in response to the rotation of one of said shafts, said cam drive means comprising a plurality of cam-drive gears of substantially equal diameter but having different numbers of teeth and an idler gear engaging said cam-drive gears, each of said cam-drive gears being connected to one of said cams for rotation therewith; and
stop means for arresting rotation of one of said output shafts comprising a rocker having a pawl on one end thereof and spring means for urging said pawl against said circumferential edges of said cams, whereby said pawl arrests rotation of said cams when said notches are simultaneously aligned with said pawl.

* * * * *

UNITED STATES PATENT AND TRADEMARK OFFICE
CERTIFICATE OF CORRECTION

PATENT NO. : 4,186,624

DATED : Feb. 5, 1980

INVENTOR(S) : Donald J. Fessett

It is certified that error appears in the above-identified patent and that said Letters Patent are hereby corrected as shown below:

Col 4., line 28,
        insert word --gear-- after "master".

Col. 4, line 44,
        "simulataneously" should read --simultaneously--.

Col. 5, line 3,
        "do" should read --to--.

Col. 6, line 28,
        "cam" should read --can--.

Col. 7, line 26,
        "1" should read --7--.

Col. 7, line 29,
        "driven" should read --drive--.

Col. 9, line 54,
        delete "said" before "said".

Signed and Sealed this

Fifteenth Day of July 1980

[SEAL]

*Attest:*

SIDNEY A. DIAMOND

*Attesting Officer*    *Commissioner of Patents and Trademarks*